March 7, 1950 W. E. STEARNS 2,499,793
INERTIA VALVE
Filed Aug. 7, 1943
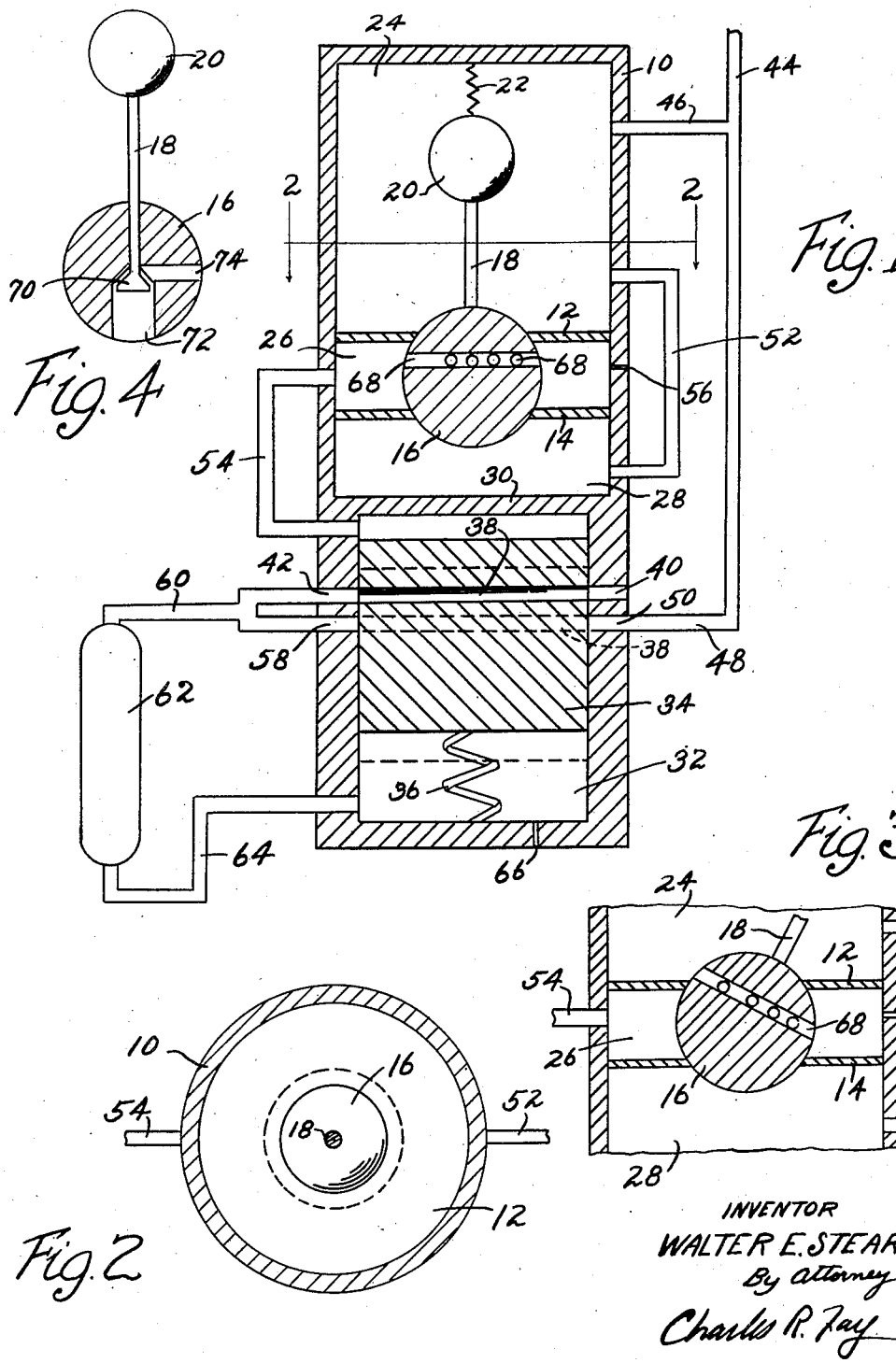
INVENTOR
WALTER E. STEARNS
By attorney
Charles R. Fay Patented Mar. 7, 1950

2,499,793

UNITED STATES PATENT OFFICE 2,499,793

INERTIA VALVE

Walter E. Stearns, Worcester, Mass.

Application August 7, 1943, Serial No. 497,831

6 Claims. (Cl. 137—139)

This invention relates in general to a novel inertia valve and also to the combination of the valve with a device which is required to receive gas under pressure rapidly and usually momentarily.

Objects of the invention include the provision of an inertia valve comprising means to operate the valve upon a sudden tilting of the valve support in any direction, and also upon a sudden acceleration even though the valve housing is not tilted; the provision of an inertia valve comprising floating means to operate the valve so that the valve will be operated upon movement of said means in any direction relative to a support for the valve; and the provision of an inertia valve as aforesaid comprising an oscillating generally spherical element with which it is associated, a weight to oscillate the element upon movement of the latter in any direction, said element embodying means to permit the passage therethrough of a gas in any tilting position of the weight and consequent oscillatory position of the element, the gas when passed through the element being operative to slide a valve element so as to either open or close the valve. In the present embodiment of the invention it is desired that the valve shall be normally closed and opened only when the element is oscillated.

Objects of the invention include the provision of the mechanism as above recited including means to centralize the oscillating element and to return the valve to its normal closed position immediately upon centralization of the oscillating element.

A still further object of the invention includes the provision of the combination of an inertia valve which is opened upon movement of the valve operating mechanism in any direction with an object which it is desired to momentarily receive a gas upon sudden movement of the valve casing, this combination being useful, for instance, to supply oxygen momentarily to an airplane pilot upon sudden deviation of the plane from a normal course such as in making sharp curves and in pulling out of a dive.

Other objects and advantages of the invention will appear hereinafter.

Reference is to be had to the accompanying drawings, in which

Fig. 1 is a central sectional view of an embodiment of the invention showing the parts in normal condition;

Fig. 2 is a cross section on line 2—2 of Fig. 1;

Fig. 3 is a section showing inclination of the valve actuating element; and

Fig. 4 is a sectional view of the valve actuating element and showing an additional construction which may be used if desired.

I provide a cylindrical housing or casing 10 in which the valve and the valve actuating mechanism is contained. Inside the casing 10 there are a pair of spaced plates 12 and 14, these plates being circular and having an aperture to receive and support a sphere 16. The apertured edges of plates 12 and 14 are rounded in a concave manner so as to support the sphere whereby the latter can oscillate in any direction having reference to a diameter of sphere 16 at right angles to the plates as in Fig. 1. Thus it will be seen that sphere 16 may, as so far described, rotate in any direction, but at the same time it is held to the plates since the latter are disposed at either side of a diameter parallel to the plates.

A stem or rod 18 extends upwardly from the sphere 16 and terminates in a relatively heavy weight 20, and a spring 22 connects the weight 20 with an end wall of housing 10, and it will be seen that this construction will provide that sphere 16 will be normally held in Fig. 1 position but that it may oscillate in any direction within the limits prescribed by weight 20.

Plates 12 and 14 divide the housing 10 into three closed chambers, these chambers being defined by a continuous partition 30 extending across housing 10 and separating chamber 28 from another chamber 32 which contains a piston 34, the latter being slidable in chamber 32. A spring 36 normally maintains the piston 34 in the position shown in Fig. 1 wherein it will be seen that a central passage 38 through the piston aligns with a port 40 to the atmosphere and with another port at 42 to be described.

A relatively high pressure line 44 is provided with a connection 46 entering chamber 24, and a line 44 extends far enough to be provided with another connection 48 which leads through the housing wall at 50. A pipe 52 connects chamber 24 with a chamber 28 and equalizes the pressure therein and another pipe 54 connects chamber 26 with the head end of chamber 32 so that pressure transmitted from chamber 26 will cause piston 34 to be moved against the action of spring 36. A pin hole 56 allows seepage from chamber 26 in order to reduce the pressure in chamber 26 which occurs during actuation of the mechanism.

Directly opposite the connection of the line 44 at 50 there is a port 58, leading with connection 42, to a single pipe 60, the latter entering an object designed to receive a momentary gas pressure from line 44, this object being designated at 62 and being only shown generally as it is not important to the present invention exactly what object 62 may be. However, by way of example, object 62 could be an oxygen mask. A pipe 64 leads from object 62 into the foot of chamber 32 below piston 34 and if desired an additional pin hole as at 66 may be employed here to provide for gradual leakage of gas pressure from the bottom of chamber 32.

In the operation of the device it may be assumed that the housing 10 is fixed, as for instance, horizontally to a moving body such as an airplane. As long as the flight of the airplane is constant in direction, weight 20 will remain stationary as shown in Fig. 1 and the sphere 16 will likewise remain fixed. In this condition piston 34 is in its raised position wherein passage 38 fails to align with ports 58, and therefore the only chambers to receive pressure from pressure line 44 will be chamber 24 and chamber 28. If, however, the plane should make a sudden turn or pull out, weight 20 will be disturbed due to its inertia and will move in a direction relative to casing 10 opposite to the direction of sudden change of the airplane. This situation is shown in Fig. 3. Sphere 16 is provided with a plurality of through passages 68 and therefore these passages, or some of them, will connect chamber 24 with chamber 26 whenever weight 20 rocks relative to the housing 10. Of course as soon as the airplane returns to a normal course spring 22 will return the weight 20 and sphere 16 to Fig. 1 position so that chambers 24 and 26 are only momentarily connected. In any case pressure from line 44 will enter chamber 26 and will be transferred to pipe 54 to the head end of cylinder 32 and will thus cause movement of piston 34 down to dotted line position thereof so as to align passage 38 with ports 50 and 58. In this case pressure from line 44 will enter directly into the object 62, since port 42 is cut off by the piston. The gas in the object 62 will momentarily accumulate and increase the pressure therein to approximately a twentieth to one-tenth part of the pressure in line 44, and this gas will escape into the foot of chamber 32 assisting spring 38 to return piston 34 to its normal position.

It will be seen from the above that upon change of direction of the vehicle, gas will be admitted into the object 62, but that this gas will remain only momentarily and hence if object 62 should take the form of an oxygen mask and the gas in line 44 is oxygen, the wearer of the mask will automatically receive a whiff of oxygen at each sharp changing direction of the airplane or other device.

Fig. 4 shows a construction wherein the weight 20 and rod 18 may move relatively to sphere 16 and the rod 18 terminates in a valve 70 which will normally be closed by spring 22, but which will open during an extreme acceleration of the housing 10 to admit gas from chamber 28 to a passage 72 into chamber 26 to a passage 74. This construction may be embodied in the construction of Fig. 1 if desired as the passage 68 will not be interfered with and thus the mechanism can be arranged to operate upon a change of conditions of the airplane flight whether of direction or speed.

Having thus described my invention and the advantages thereof, I do not wish to be limited to the details herein disclosed, otherwise than as set forth in the claims, but what I claim is:

1. An inertia valve comprising a housing, a valve therein, a universally movable weight, a connection between the valve and weight for actuation of the former by the latter upon movement thereof, a source of pressure normally closed by the valve, and a spring directly connected to the weight and to a fixed point in the housing.

2. An inertia valve comprising a housing, a valve therein, a weight movable in different angular directions, a spring directly connected to the weight and to a fixed point in the housing, a connection between the weight and valve for actuation of the latter by the former upon movement thereof relative to the housing in any direction, and a source of pressure normally closed by the valve.

3. An inertia valve comprising a housing, a valve, a weight mounted for universal movement, a spring directly connected to the weight and to a fixed point in the housing, a connection between the weight and valve to actuate the latter upon any movement of the former relative to the housing, a source of pressure normally closed by the valve, said valve being opened upon movement of the weight.

4. An inertia valve comprising a housing, separate chambers therein, a pressure equalizing connection between two of said chambers, a third chamber separated from the other two, a source of gas under pressure leading into the third chamber, an oscillatory valve in one of the first named chambers for connecting or selectively closing off said third chamber from the first named other chambers, a weight mounted for movement in different angular directions, a connection between the weight and valve for actuation of the latter by the former upon movement of the weight in any of its directions relative to the housing.

5. A device of the class described comprising a housing, a pair of spaced plates therein, a spherical body mounted in and between said plates for oscillatory motion thereon, a passage thru the body, a weight for oscillating the body by inertia, and means tending to retain the weight and body in one position thereof except upon sudden movement of the housing.

6. A device of the class described comprising a housing, a pressure chamber therein, a weight in said chamber mounted for oscillatory motion, a partition defining a wall of the chamber, an oscillatory valve body having a seat, said body being mounted in the partition, a slidable connection between the weight and valve body, said weight being effective to oscillate the valve body, means including said seat providing a gas passage in said valve body, and a head on said slidable connection cooperating with the valve body seat to control fluid flow in response to sliding movement of the said connection.

WALTER E. STEARNS.

REFERENCES CITED

The following references are of record in the file of this patent:

UNITED STATES PATENTS

| Number | Name | Date |
| --- | --- | --- |
| 739,918 | Parke | Sept. 29, 1903 |
| 1,154,396 | Hayot | Sept. 21, 1915 |
| 1,184,222 | Zerbe | May 23, 1916 |
| 1,447,797 | London | Mar. 6, 1923 |
| 1,865,125 | McCune | June 28, 1932 |
| 1,908,762 | Johnston | May 16, 1933 |
| 2,110,692 | Aikman | Mar. 8, 1938 |
| 2,246,902 | Farmer | June 17, 1941 |
| 2,255,965 | Brandon | Sept. 16, 1941 |
| 2,271,833 | Shipman | Feb. 3, 1942 |
| 2,299,599 | Shultz | Oct. 20, 1942 |
| 2,324,464 | Parker | July 20, 1943 |

FOREIGN PATENTS

| Number | Country | Date |
| --- | --- | --- |
| 124,318 | Great Britain | Mar. 27, 1919 |